United States Patent [19]
Duncan et al.

[11] Patent Number: 5,917,483
[45] Date of Patent: *Jun. 29, 1999

[54] ADVANCED WINDOWS MANAGEMENT FOR A COMPUTER SYSTEM

[75] Inventors: Joseph Duncan, Berkeley; Robert Giljum, Fremont; Joshy Joseph, Union City, all of Calif.

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/529,315

[22] Filed: Sep. 18, 1995

[51] Int. Cl.$^6$ .................................................. G06F 15/00
[52] U.S. Cl. ........................ 345/333; 345/340; 345/348; 345/349
[58] Field of Search .................................. 395/329, 330, 395/331, 332, 333, 334, 335, 339, 340, 342, 346; 345/329, 330, 348, 349, 340, 333

[56] References Cited

U.S. PATENT DOCUMENTS

| | | | |
|---|---|---|---|
| 5,187,788 | 2/1993 | Marmelstein | 395/700 |
| 5,519,866 | 5/1996 | Lawrence et al. | 395/700 |
| 5,544,302 | 8/1996 | Nguyen | 345/340 |
| 5,561,757 | 10/1996 | Southgate | 395/340 |
| 5,572,649 | 11/1996 | Elliott et al. | 395/340 |
| 5,598,524 | 1/1997 | Johnston et al. | 395/348 |
| 5,675,752 | 10/1997 | Scott et al. | 345/333 |

*Primary Examiner*—Huynh Ba
*Attorney, Agent, or Firm*—Fliesler, Dubb, Meyer & Lovejoy

[57] ABSTRACT

An advanced windows management system permits a user to customize views from a plurality of frame windows into a single target window. A view includes display information that corresponds to an underlying program. The user selects views from the frame windows, and the user specifies a target window for placement of the views, including the arrangement of the views, in the target window via a drag and drop operation. In response, the advanced windows management system docks and displays the selected views in the target window. The views may comprise textual, graphical and control information for a plurality of editors or tools used in software development. Through use of the advanced windows management system, a user generates editor windows that include views from tools and editors. Thus, the user is permitted to customize the editor window to include views for editors used on a project.

15 Claims, 15 Drawing Sheets

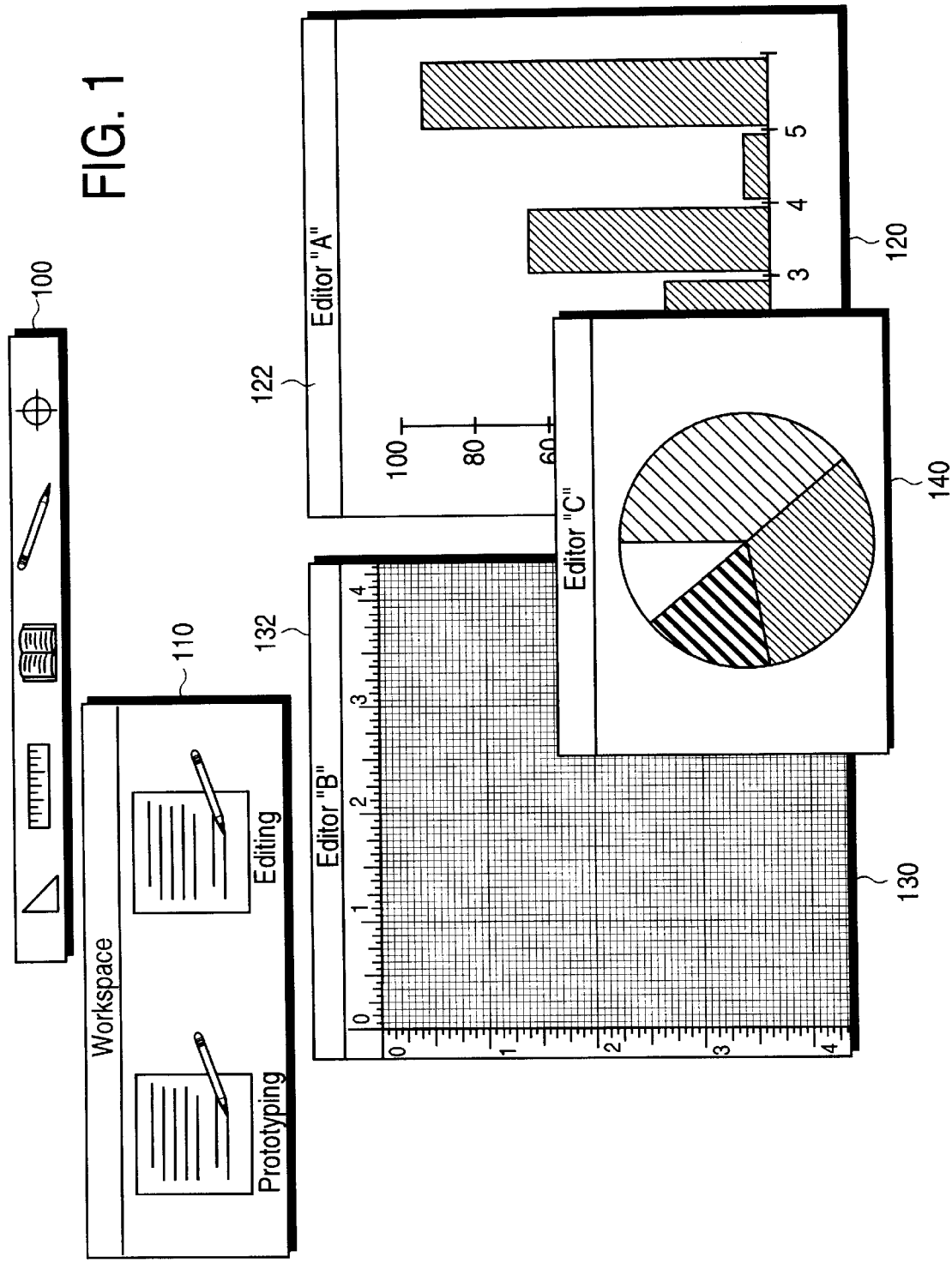

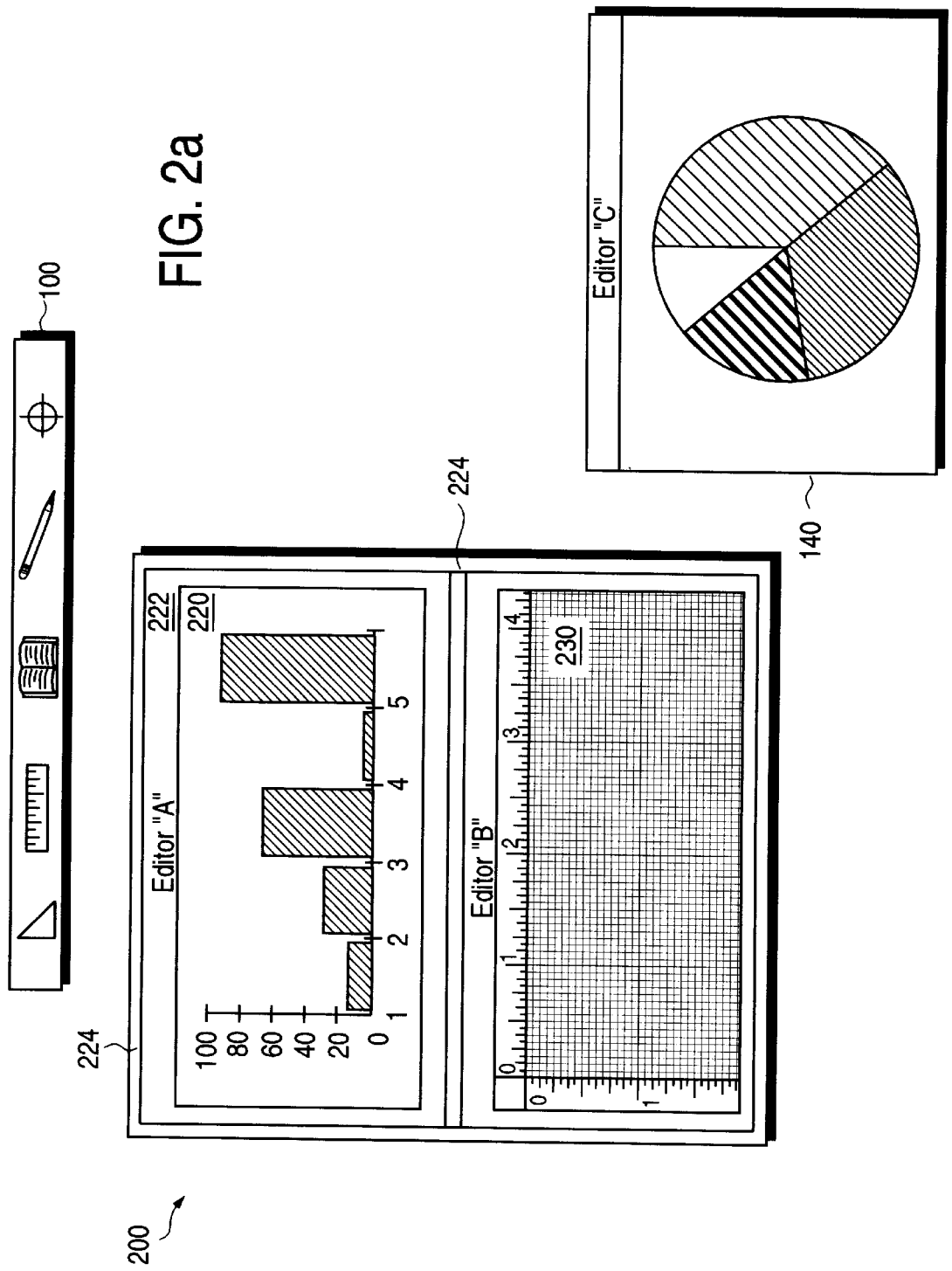

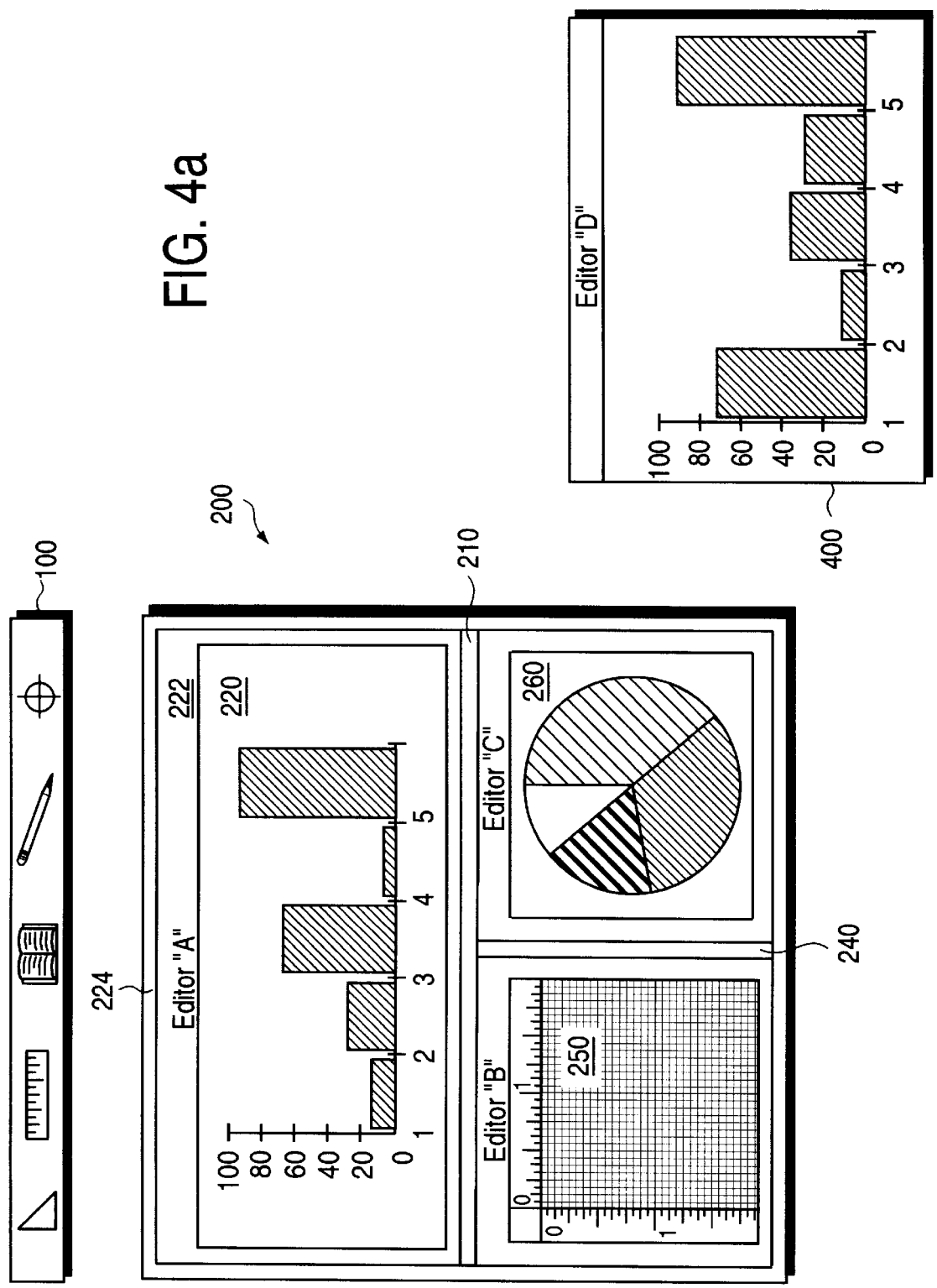

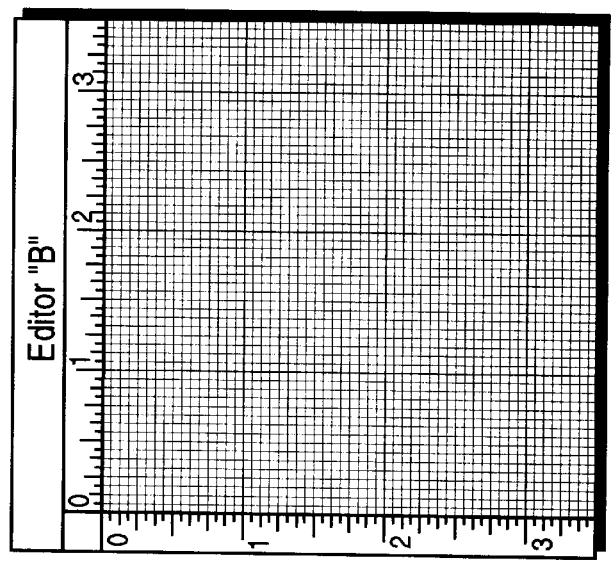
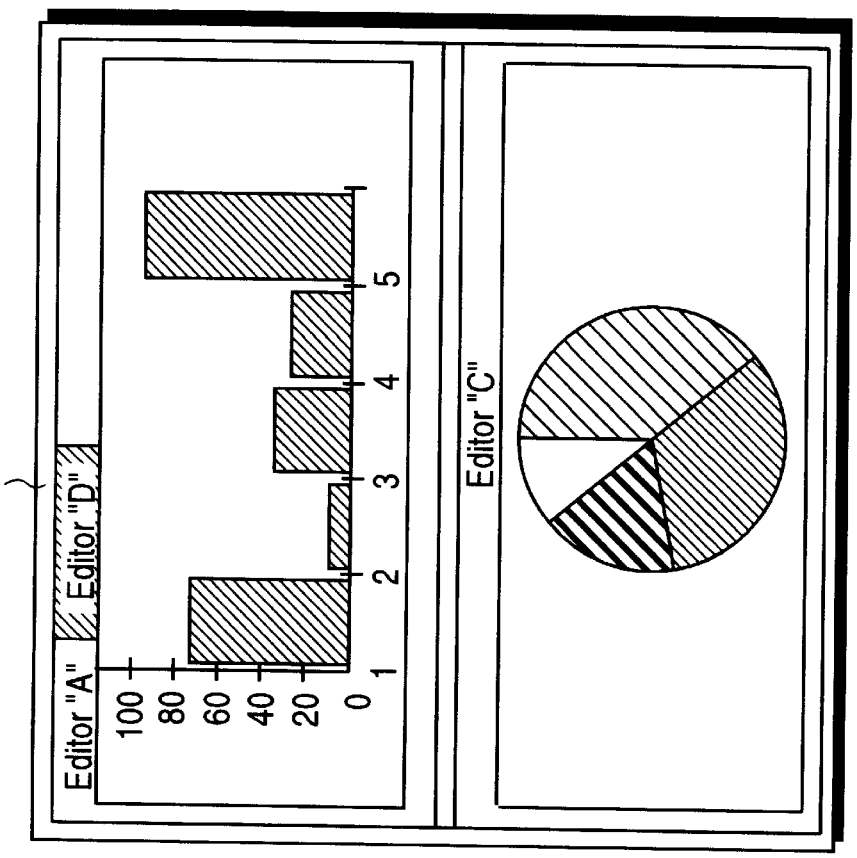
FIG. 6

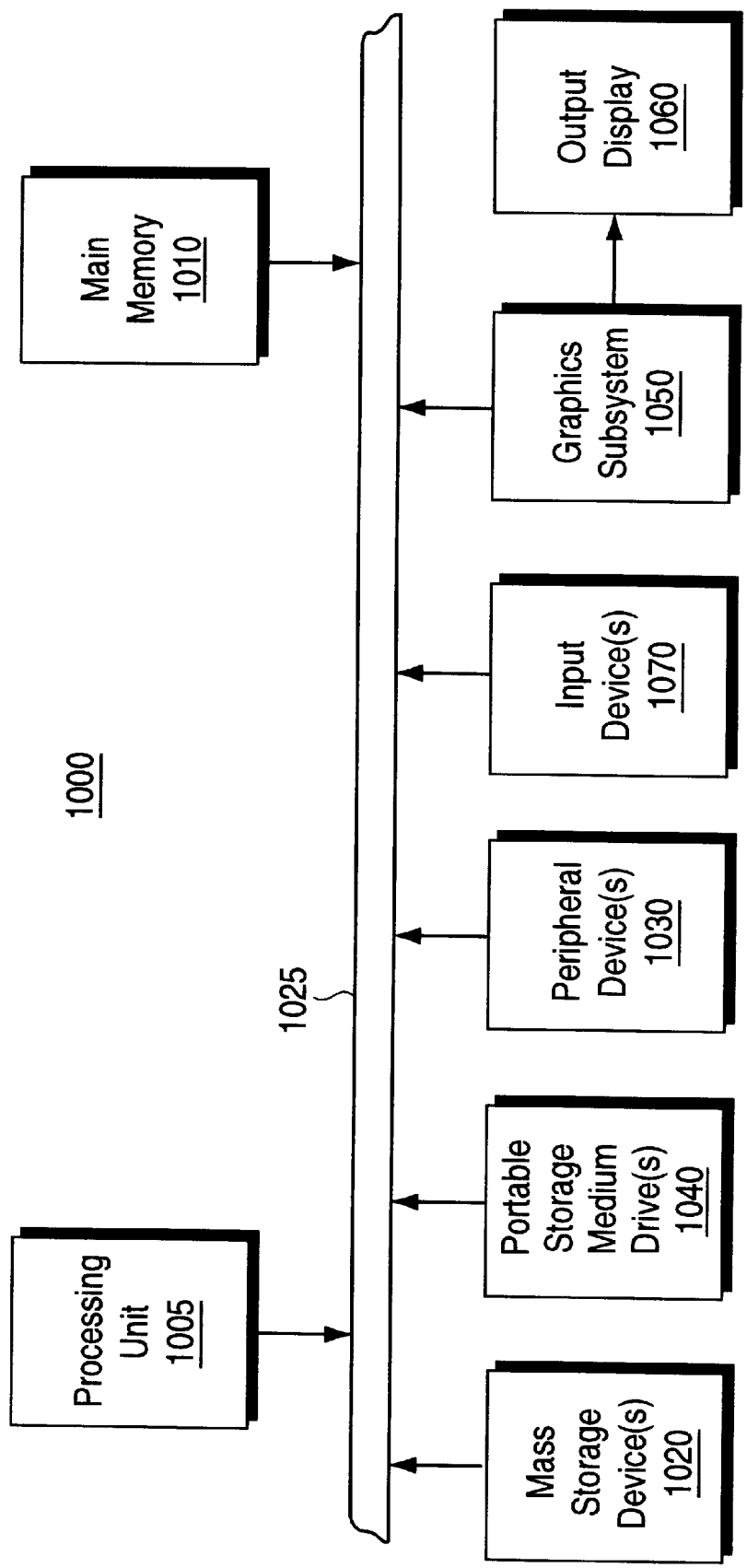

ADVANCED WINDOWS MANAGEMENT FOR A COMPUTER SYSTEM

FIELD OF THE INVENTION

The present invention relates to the field of user interfaces, and more particularly to an advanced windows management system for a computer.

BACKGROUND OF THE INVENTION

As a means for providing information to a user, a computer program, operating on a computer system, displays textual and graphical information on an output display. A computer system, which operates in a multi-tasking environment, may contain more than one program resident in memory at the same time. In general, a windows operating system environment displays the textual and graphical information of each program in individual windows. For example, in a multi-tasking computer system, the computer may display a view for a word processing program in a first window, and a view for a spreadsheet program in a second window. If a user has activated several programs, then a window for each program is displayed resulting in the display of several windows.

A windows operating system environment permits the user to move the windows. Typically, a user moves the windows to accommodate a desired arrangement of the windows suitable for the user's requirements. For example, a user of a computer system may in the course of a project invoke the use of several programs. If each program displays a view for the program in a separate window, then the user moves the windows to accommodate a desired configuration when shifting the thread of execution for one program to another. Furthermore, a user may use the same set of programs when working on a project. Therefore, it is desirable to provide a windows system that provides a user complete flexibility to customize the arrangement of views that correspond to different programs.

SUMMARY OF THE INVENTION

An advanced windows management system permits a user to customize views from a plurality of frame windows into a single target window. In response to user input, the advanced windows management system displays one or more frame windows, wherein each frame window contains a view for a program. In general, a view includes display information that corresponds to the underlying program. The user selects, through use of a cursor control device, views from the frame windows, and the user specifies a target window for placement of the views, including the arrangement of the views, in the target window. In a preferred embodiment, the user customizes the views in the target window via a drag and drop operation. In response, the advanced windows management system docks and displays the selected views in the target window.

In one embodiment, the views comprise textual, graphical and control information for a plurality of editors or tools used in software development. Through use of the advanced windows management system, a user generates editor windows that include views from tools and editors. Thus, the user is permitted to customize the editor window to include views for editors used concurrently. For example, the views of editors in an editor window may support a phase of software development. The advanced window management systems also supports docking panes from other windows as well as docking entire windows into a specified target window.

Other features and advantages of the present invention will be apparent from the accompanying drawings, and from the detailed description that follows below.

BRIEF DESCRIPTION OF THE DRAWINGS

The features and advantages of the present invention will be apparent from the following detailed description of the preferred embodiment of the invention with references to the following drawings.

FIG. 1 illustrates a display including a plurality of views for example tools or editors.

FIG. 2a illustrates the result of docking example views into a single window.

FIG. 4a illustrates an editor window containing panes that display views for editors a plurality of example editors.

FIG. 6 illustrates an example display to float an example view from the editor window.

FIG. 11 illustrates a high level block diagram of a general purpose computer system in which the advanced windows management system of the present invention may be implemented.

DETAILED DESCRIPTION

Figure 2B:
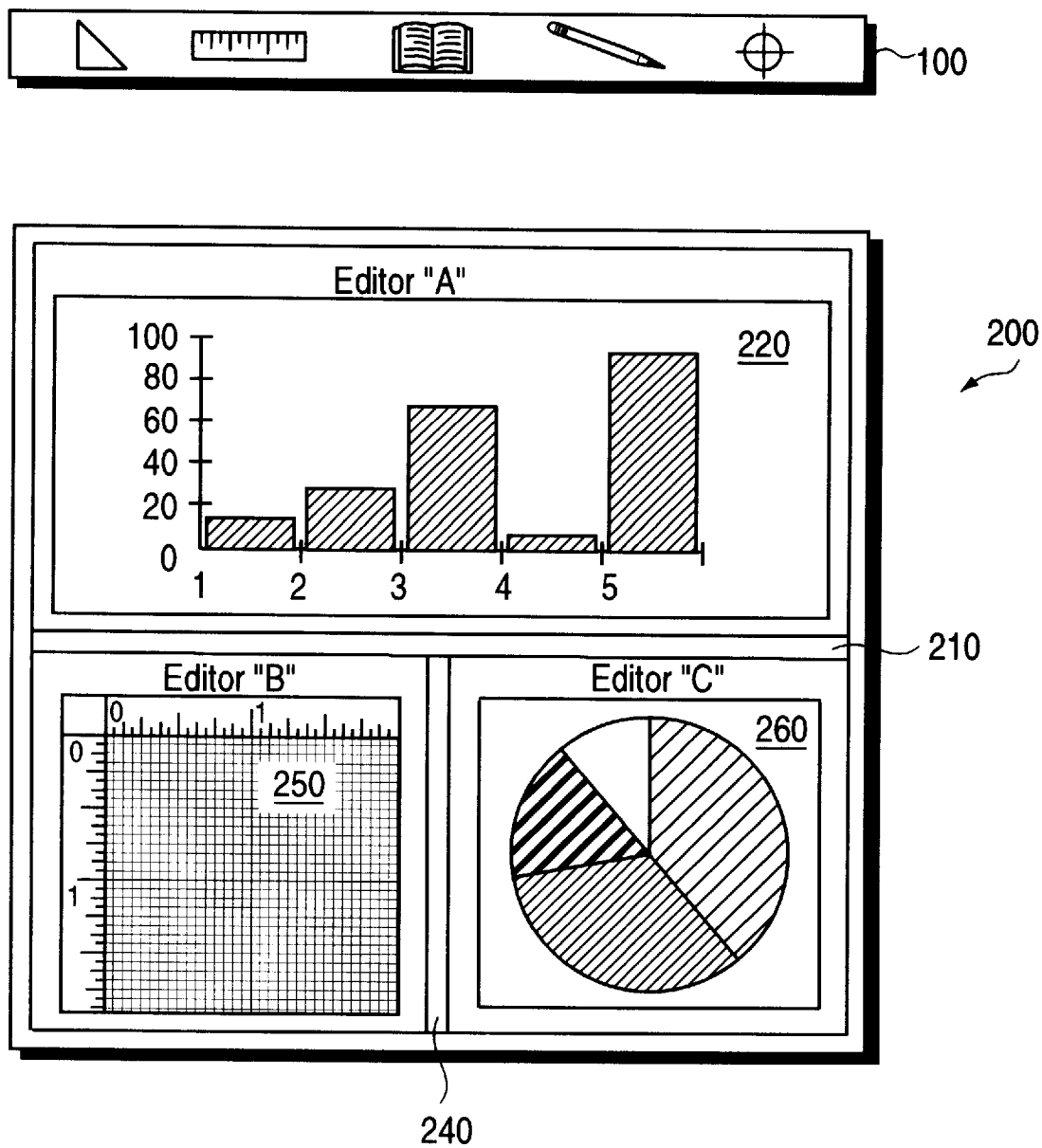
FIG. 2b illustrates the editor window modified to include the docking of an additional view.

An advanced windows management system permits a user to customize the arrangement of views in one or more target windows. In general, the views are graphical, textual and control information that correspond to an underlying computer program (e.g. the display for a program). In accordance with traditional windows displays, views, for different underlying programs, are displayed in separate frame windows. Through use of the advanced windows management system, a user is permitted to combine views of one or more frame windows into a single target window. In the preferred embodiment, the user combines the views via a drag and drop operation. In addition, a user is permitted to add, delete and edit entire windows and panes, which are portions of windows that contain one or more views, within a target window. Consequently, through use of the advanced windows management system, there is no strong binding between a view and a frame window that holds the view.

In one application for the advanced windows management system, the views are graphical, textual and control information that correspond to editors and tools used in software development. For this application, various tools and editors are utilized by a software developer through the product life cycle. Example tools may include diagramming tools, modeling tools, prototyping tools, a form layout editor, etc. One application of the advanced windows management system of the present invention is for use with software development tools, available from Oracle® Corporation, Redwood Shores, Calif., the Assignee of the present invention. However, any tool or editor, such as OCX editors, may be used in conjunction with the advanced windows management system of the present invention. Although the present invention is described in conjunction with tools or editors used to develop software, any views displayed in connection with any program, such as an application program, may be used without deviating from the spirit and scope of the invention. For example, the views may be displays for application programs such as word processing programs, spreadsheet programs, drawing programs, etc.

A software developer may use different tools and editors depending upon the stage of development in the product life cycle. For example, the software developer may use a first set of tools and editors to model the program under development, and a second set of tools and editors to prototype the program. Therefore, to accommodate the various stages of the product life cycle, workspaces, including editor windows, are specified. In general, a workspace comprises resources, including user customized editor windows, that pertain to a specific task or function. For the above example, a user may customize a first editor window to include views for the editors and tools used to model the program. In a second customized editor window, the user may specify views for the editors and tools used to prototype the program. Therefore, the advanced windows management system of the present invention permits a user to customize any number of editor windows for a specific task or function. As described fully below, the user specifies, not only the specific views for combination in an editor window, but also the arrangement and size of the views in the editor windows.

FIG. 1 illustrates a display including a plurality of views for example tools or editors. FIG. 1 also shows a workspace window 110 that includes icons that correspond to workspaces for selection by a user. As a starting point to customize an editor window, a user launches, from a toolbar 100, a plurality of tools or editors labeled editor "A", editor "B", and editor "C" in FIG. 1. The editors are designated with letters of the alphabet so as to not obscure the explanation of the advanced windows management system. However, as discussed above, preferably, the editors are resources used cooperatively by a user to achieve specified functions, such as functions relating to a phase in a product life cycle for software development. For example, editors "A", "B", and "C" may all be used by a programmer cooperatively to model a software program under development.

As a result of invoking the editors, frame windows that display a view for the corresponding editors are displayed. For this example, a frame window 130 displays the view for editor A, frame window 140 displays the view for editor "C", and frame window 120 displays the view for editor "B." Note that editor "A", editor "B", and editor "C" shown in FIG. 1 each display a single view in a separate frame window. For example, the view for editor "A" includes a bar graph displayed in the single frame window 130.

FIGS. 2a and 2b illustrate displays with docked views associated with separate frame windows and different editors into a single target window. In general, the advanced windows management system permits grouping and docking selected views into a customized single target window. The target window is entitled an editor window for the software development application. In a preferred embodiment, the users dock views, panes and windows to an editor window through execution of a drag and drop operation. For the drag and drop embodiment, a user selects, via a cursor control device, a view, pane or window, drags the selected view, pane or window into the target window, and "drops" the selected view, pane or window into a desired location within the target window. Although the advanced windows management system is described in conjunction with a drag and drop operation, the function of selecting views and frame windows for inclusion in a target window may be accomplished through any user interface operation. For example, this function may be executed through use of command keys and or key strokes on a keyboard, as well as pull down menus displayed from a command bar.

FIG. 2a illustrates the result of docking the view from editor "B" and the view from editor "A" into a single window. In one embodiment, to generate this arrangement, a user first selects or grabs the frame window 130 in the border area, labeled 132 in FIG. 1. To accomplish this, the user places the cursor on the border area and presses a control button on the cursor control device. In addition, the user invokes an indication, such as a control key, to differentiate the drag gesture for docking from the standard drag gesture used to a move a window. The user then drags, while holding the control button in an activated position, the frame window 130 to a position over the lower portion of the frame window 120. The advanced windows management system provides graphical feedback to indicate to the user the position in which the view or frame window will be docked, if dropped. To complete the operation, the user drops the frame window 130 into the frame window 120 by releasing the cursor control button. As a result, an editor window, labeled 200 in FIG. 2a, is generated with the view of editor "A" displayed in the top portion, and a view of editor "B" displayed in the bottom portion of the editor window 200. Also, the editor window 200 shown in FIG. 2a may be generated by dragging and dropping the frame window 120, which displays the view for editor "A", into the top portion of frame window 130. Furthermore, a shell editor window may be generated, and both the frame window 120 and the frame window 130 may be dropped into the shell editor window in their respective positions.

The advanced windows management system generates editor windows as a result of the drag and drop operation described above. The editor windows include at least one pane, as well as one or more views corresponding to each pane. The editor windows may also contain one or more splitters to delineate among two or more panes. Furthermore, editor windows include a border, which includes a title bar, that is used to drag and drop as well as to move the entire editor window. For the example illustrated in FIG. 2a, the editor window 200 contains panes 220 and 230, and a splitter 210. The pane 220 contains the view for the editor "A", and the pane 230 contains the view for the editor "B." The splitter 210, a horizontal splitter, divides the pane 220 from the pane 230. Furthermore, the editor window 200 contains a border 224.

When a pane is the only pane in an editor window, the pane is in a floating state. Otherwise, the pane is in a docked state. Regardless of whether a pane is in the floating or docked state, a pane may include one or more views. In the preferred embodiment, when a pane is docked, a border area is displayed within the pane and outside of the view. For the example illustrated in FIG. 2a, the border area for pane 220 is labeled 222. The border area for a pane is utilized as a pick or select area for dragging and floating the pane. When a pane is floating, the pick or select area inside the corresponding pane is not displayed. In this case, the operation to drag the pane is equivalent to the operation to drag a window.

FIG. 2b illustrates the editor window 200 modified to include the docking of the view for the editor "C." For this example, the user grabs the frame window 140 displaying the view for the editor "C", including invoking the control key for the docking operation, drags the frame window 140 into the lower right corner of editor window 200, and drops the frame window 140 to dock the view of editor "C" into the editor window 200. In response, the advanced windows management system generates a pane 260, and a vertical splitter 240 to separate panes 250 and 260. FIGS. 2a and 2b illustrate an example of docking three separate frame windows into a single customized editor window, however, any number of frame windows and views may be docked into a single editor window to create a customized work space.

A user, after generating customized editor windows, may save the editor windows for subsequent retrieval. For example, a user may title and save an editor window for later use when those functions relating to the editor window are required. In addition, a user may create multiple views of a single editor if the creation of multiple views is supported by the underlying editor. In one embodiment, the user double clicks with the cursor control device on the border area of the frame window of an editor while the user holds down the shift key to generate another view for the same editor. Also, in the preferred embodiment, the user may generate a new view from a view menu. When new editor views are launched by the user, the views are floating in their own frame windows. At this point, the user may drag and drop the views in a pane or window. Furthermore, views may be closed by the user through invocation of a function displayed on a system menu box.

Figure 3B:
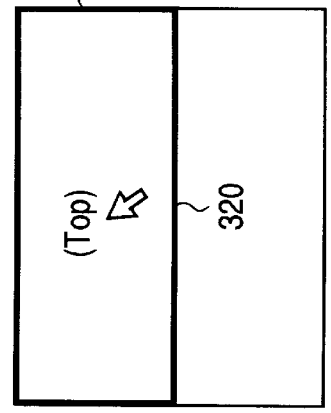
FIG. 3b illustrates graphical feedback displayed when a selected view, pane or window is placed in the top portion of the pane.
Figure 3D:
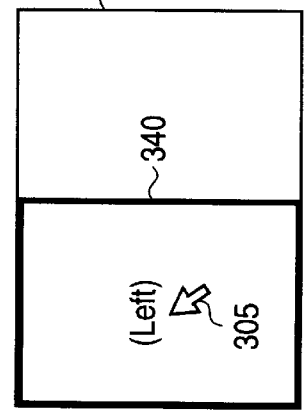
FIG. 3d illustrates graphical feedback displayed when a selected view, pane or window is placed in the left center proximity.
Figure 3A:
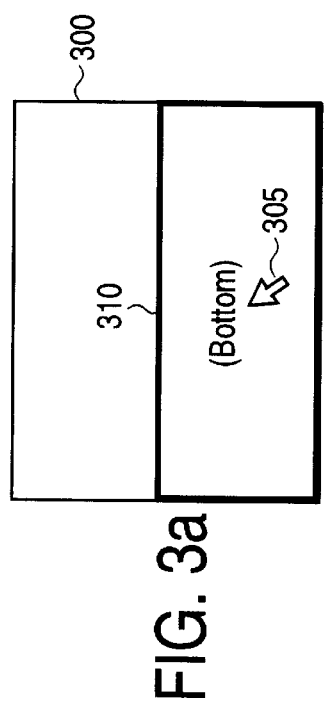
FIG. 3a illustrates graphical feedback displayed when a selected view, pane or window is placed in the lower center proximity of the target window.

FIGS. 3a–3e illustrate graphical feedback for docking views, panes and windows in accordance with one embodiment of the present invention. FIG. 3a illustrates graphical feedback displayed on a pane 300 when the selected view, pane or window is placed in the lower center proximity of the pane. Specifically, when the user places a selected view, pane or window in the lower center portion of a pane, as indicated by cursor 305, then the advanced windows management system displays a highlighted box 310 in the lower portion of the pane 300 to indicate that dropping the selected view, pane or window will result in docking it in the lower portion of the pane. FIG. 3b illustrates graphical feedback for placement of a view, pane or window in the top portion of a pane 300. As shown in FIG. 3b, the rectangular box 320 is generated in response to the placement of cursor 305 in the top portion of pane 300.

Figure 3C:
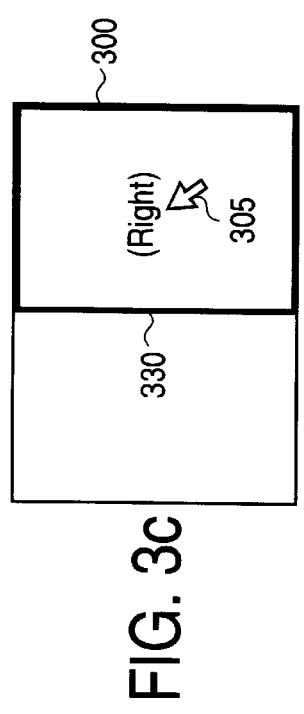
FIG. 3c illustrates graphical feedback displayed when a selected view, pane or window is placed in the right center proximity.
Figure 3E:
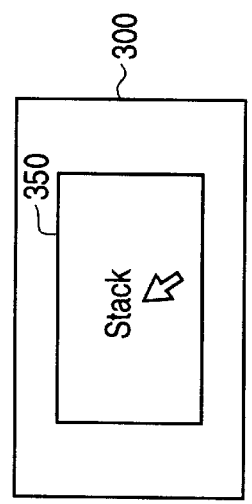
FIG. 3e illustrates graphical feedback for stacking one or more views directly on top of a single pane.

FIGS. 3c and 3d illustrate graphical feedback for placement of a view, pane or window in the right portion and left portion of a pane, respectively. Specifically, a highlighted box 330 in FIG. 3c depicts docking the pane, view or window in the right side of pane 300 in response to placement of cursor 305 in the right center proximity. A highlighted box 340 in FIG. 3d denotes docking the pane, view or window in the left side in response to the placement of cursor 305 in the left center proximity. FIG. 3e illustrates graphical feedback for stacking one or more views directly on top of a single pane 300. As shown in FIG. 3e, a highlighted box 350 is generated in response to placement of a cursor 305 in the center portion of pane 300. The stacking of multiple views on a single pane is described more fully below.

Figure 4B:
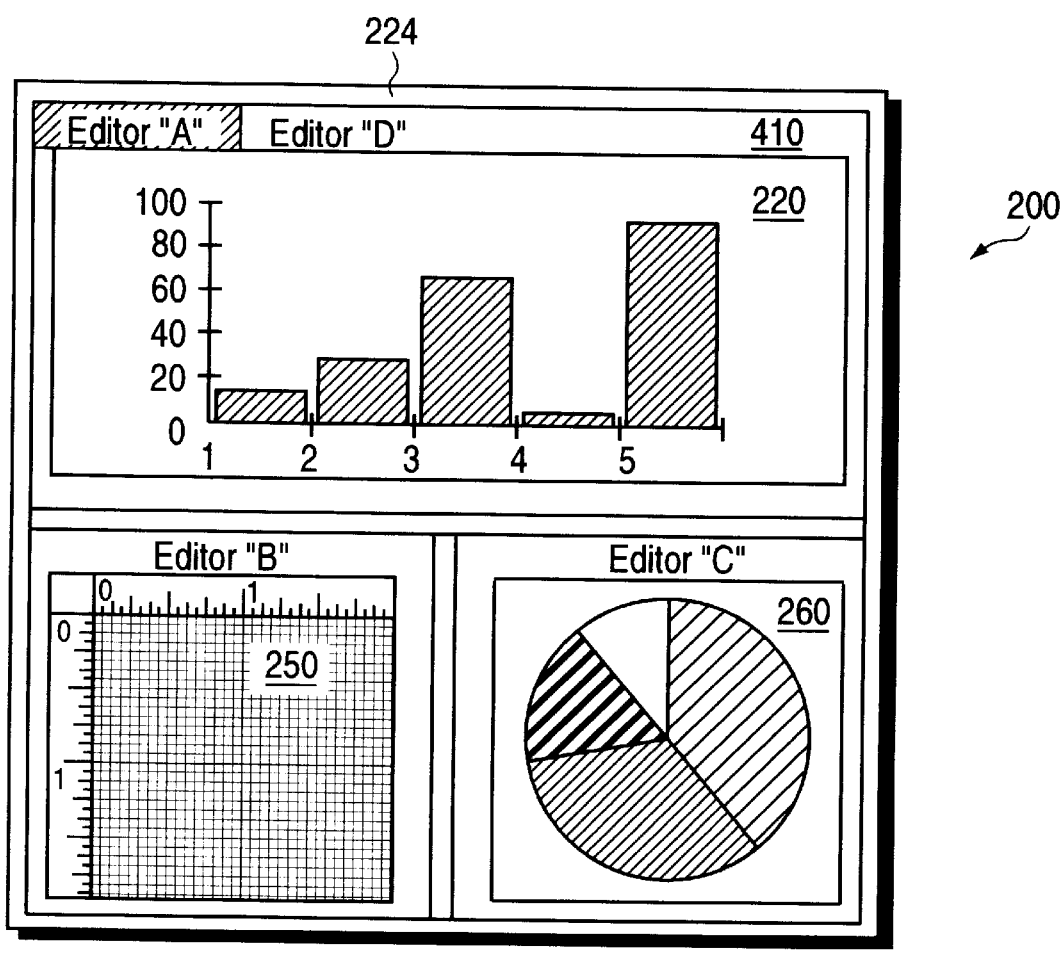
FIG. 4b illustrates a modified editor window with an additional view docked in a single pane.

FIGS. 4a and 4b illustrate docking a pane, view or window on a pane with an existing view. FIG. 4a illustrates the editor window 200 containing panes 220, 250 and 260 that display views for editors "A", "B", and "C", respectively. FIG. 4a also shows a frame window 400 that displays a view for an editor "D", launched from toolbar 100. For this example, the user desires to dock the view of editor "D" into the pane 220 in editor window 200. FIG. 4b illustrates a modified editor window 200 with an additional view docked in pane 220. Starting with the display of FIG. 4a, the user drags and drops the frame window 400 onto the pane 220. In response, the advanced windows management system stacks both views of editors "A" and "D" on the single pane 220. In the preferred embodiment, a pane that contains more than one view displays the titles of the views in the title bar of the corresponding pane. As shown in FIG. 4b, for the above operation, the editors "A" and "D" are displayed in a tab group 410. Also, in the preferred embodiment, the advanced windows management system highlights the title of the currently selected view in the corresponding pane. For the example as shown in FIG. 4b, the editor "A" is highlighted to indicate that the view for editor "A" is currently displayed.

Figure 4C:
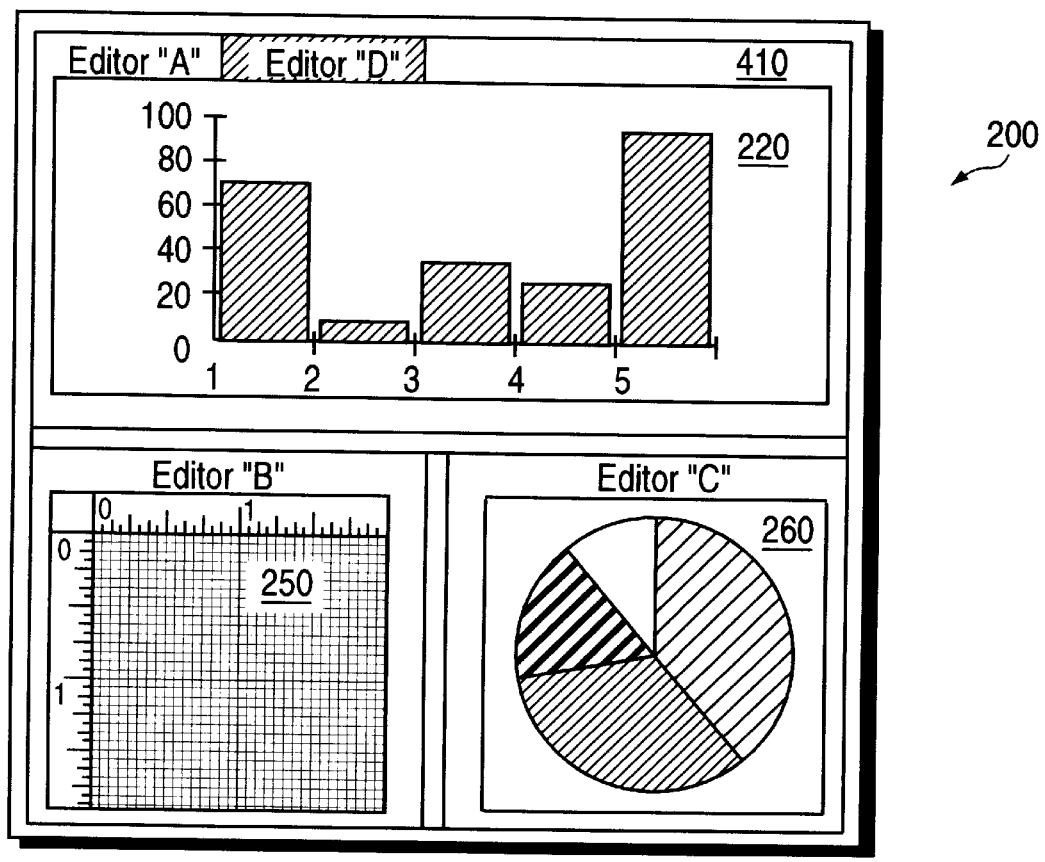
FIG. 4c illustrates the switching of the display for a different view in a pane that contains multiple views.

In order to switch the display for a different view in a pane that contains multiple views, the user, through use of the cursor control device, selects a title of the view from the tab group 410. For example, from the display illustrated in FIG. 4b, a user selects the editor "D" from the tab group 410 to display the view corresponding to editor "D." The result of this operation is shown in FIG. 4c. A user may stack as many views on a single pane as desired. In addition to stacking views on a pane that constitutes a portion of a editor window as illustrated in FIGS. 4a–4c, a user may stack one or more views on a editor window that contains a single pane. In this configuration, the editor window displays only a single view at a time, similar to a standard frame window. This configuration results in efficient use of screen space as opposed to displaying two separate frame windows that overlap.

Figure 5:
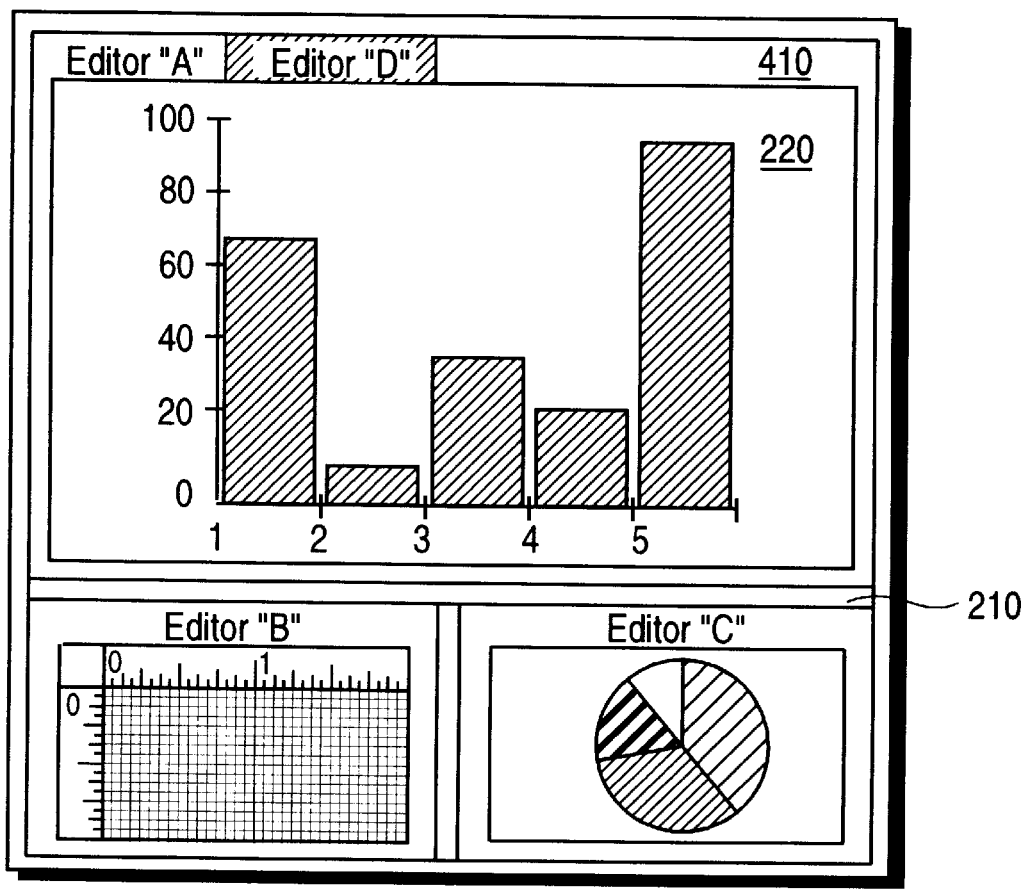
FIG. 5 illustrates an example for resizing panes in an editor window.

As illustrated by the above examples, the advanced windows management system of the present invention permits complete customization of editor windows. In a preferred embodiment, the advanced windows management system further includes the ability to resize panes in the editor windows. For example, in the editor window 200 illustrated in FIG. 4b, a user may currently be working with editor "A." For this example, when currently working with the editor "A", a user may desire a larger display area for the view of editor "A." FIG. 5 illustrates an example for resizing panes in an editor window. For this example, the editor window 200 is resized to obtain a larger display area for pane 220. In a preferred embodiment, a user resizes the panes through use of the splitters. For this example, through use of a cursor control device, the user selects splitter 210, and drags splitter 210 to increase the display view for editor "A." In addition to resizing the display areas in the panes, a user may resize the entire frame window in accordance with well-known techniques for resizing windows.

The advanced windows management system of the present invention further permits ease in floating and docking views, panes and windows. For the example editor window 200 illustrated in FIG. 4b, a user may desire to "undo" or float a previously docked view. For example, a user may desire to float or undo the docking of the view for editor "B" in pane 250. In a preferred embodiment, to complete this operation, a user, through use of the cursor control device, selects the tab group area for the pane 250, and executes a predetermined input sequence to float the selected view, pane or window. In one embodiment, the user input sequence includes double clicking on the border in the pane with the cursor control device. FIG. 6 illustrates an example display to float the view for editor "B" from the editor window 200.

The advanced windows management system retains the exact position and size, in screen coordinates, of a view, pane or window that the view, pane or window had previous to docking the view (i.e. when the view was floating). When the user doubles clicks in the border area of a view or pane, the advanced windows management system floats the view or pane in the exact position and the exact size exhibited previously when the view or pane was floating. Furthermore, the position of a docked pane or view, relative to other panes and views, is retained by the advanced windows management system. If a user double clicks with the cursor control device on the title bar of a floating window, and the user presses a control key, then the advanced windows management system attempts to restore the window in the last docked position. By executing these operations, a user may add and/or delete any number of views and panes from an editor window. Consequently, the advanced windows management system provides complete flexibility in customizing frame windows for workspace applications.

Figure 7:
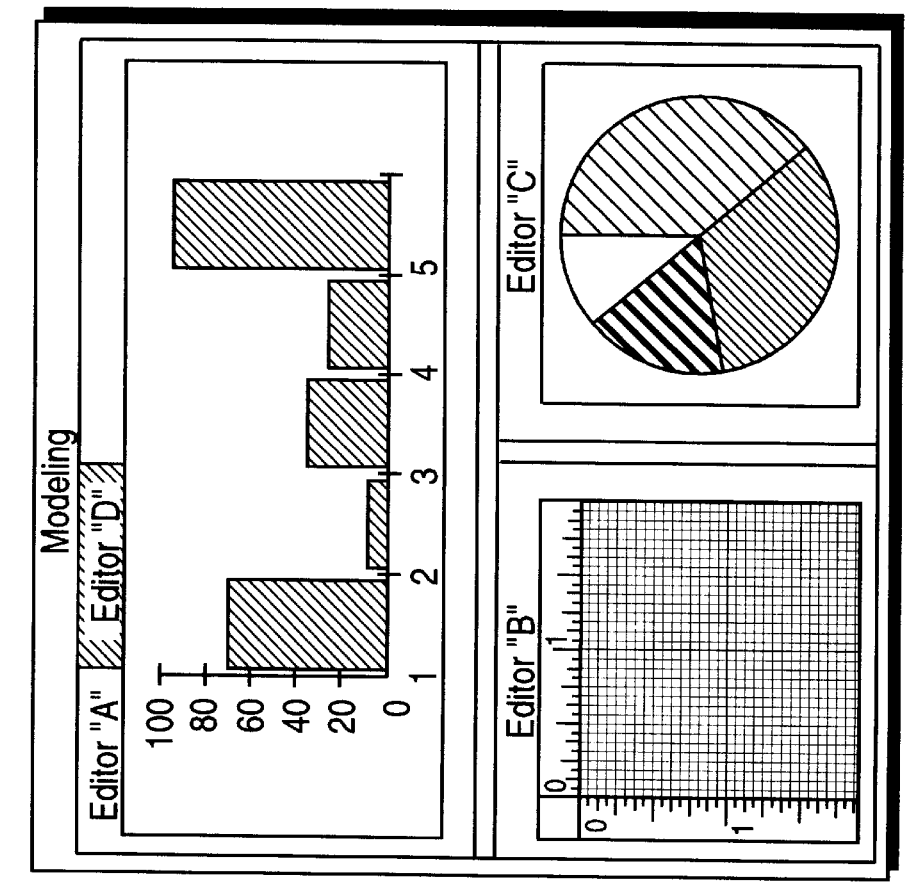
FIG. 7 illustrates a display that includes a dialog box to name an editor window.

In one embodiment, the advanced windows management system of the present invention permits naming or titling the editor window corresponding to a particular workspace. FIG. 7 illustrates naming an editor window. To accomplish this, the user invokes a dialog box to enter the name of the customized editor window. For this particular example, a user entered the name "Modeling" to indicate that the grouping of editors "A", "B", "C" and "D" reflect the editors and tools used in modeling a software program.

If permitted by the underlying editor or tool, the advanced windows management system permits a user to create several customized editor windows for operation under a single development environment. Therefore, different editor windows may contain some of the same editors. For example, a user may desire to use a subset of editors available for a first phase of development and use a second subset of editors for a second phase of development, wherein some editors may be used in both phase 1 and phase 2. For this example, a user may create a first editor window for the first phase of development, and a second editor window for the second phase of development.

Figure 8:
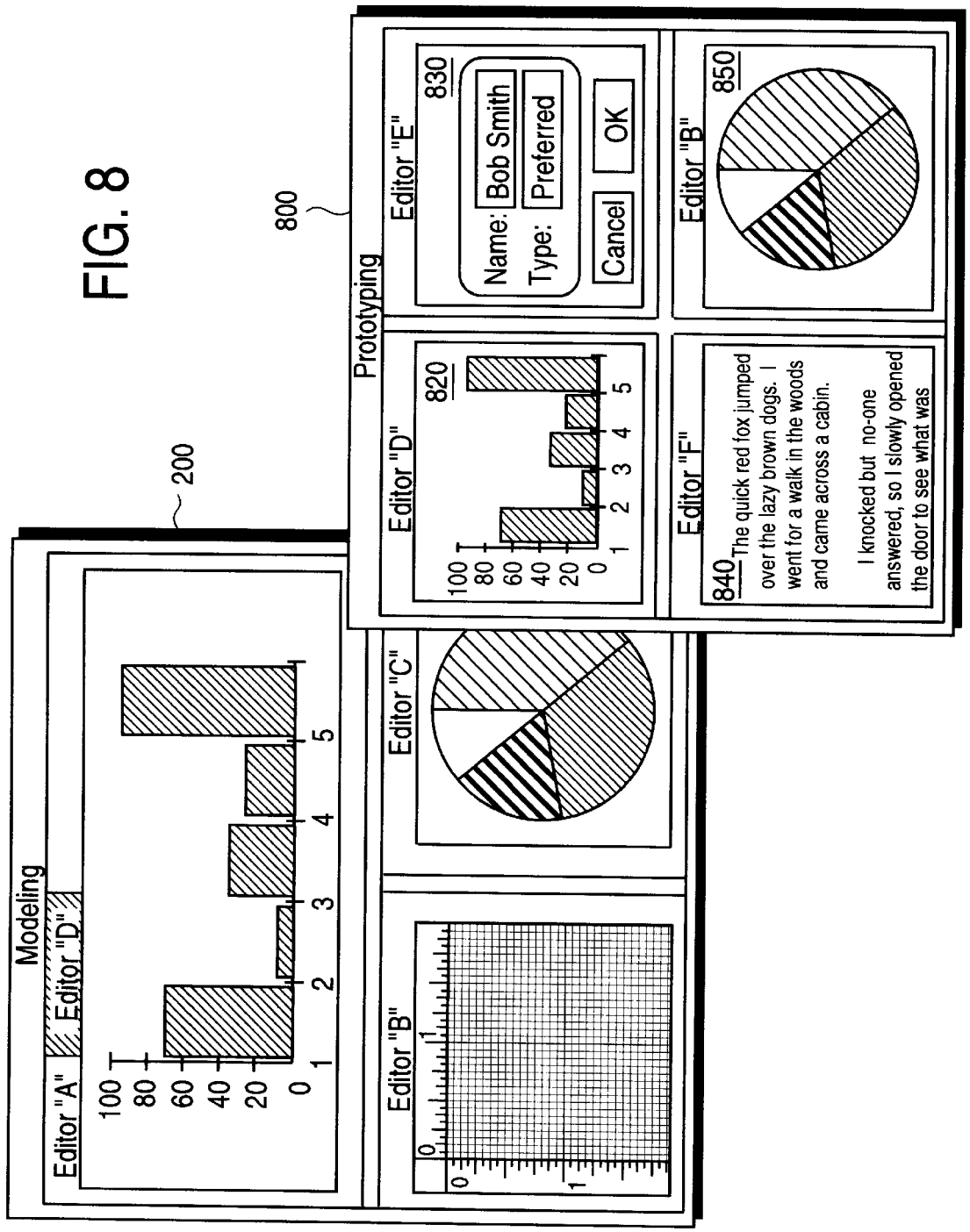
FIG. 8 illustrates two example editor windows.

FIG. 8 illustrates two editor windows. For the example shown in FIG. 8, a user may desire, in a first phase of development, to model an application program. In a second phase of development, the user may desire to prototype the application program. For this example, the editor window 200 contains views for editors A, B, C, and D that were selected by the user for use in the modeling phase of software development. Also shown in FIG. 8 is an editor window 800. Editor window 800, labeled "Prototyping" in the title bar 810, contains a view for editor "D" in pane 820, a view for editor "E" in pane 830, a view for editor "F" in pane 840, and a view for editor "B" in pane 850. As shown in FIG. 8, if permitted by the underlying editor or tool, two different editor windows may contain a subset of the same tools. For this example, the modeling editor window and the prototyping editor window both contain views for editor windows B and D.

Figure 9:
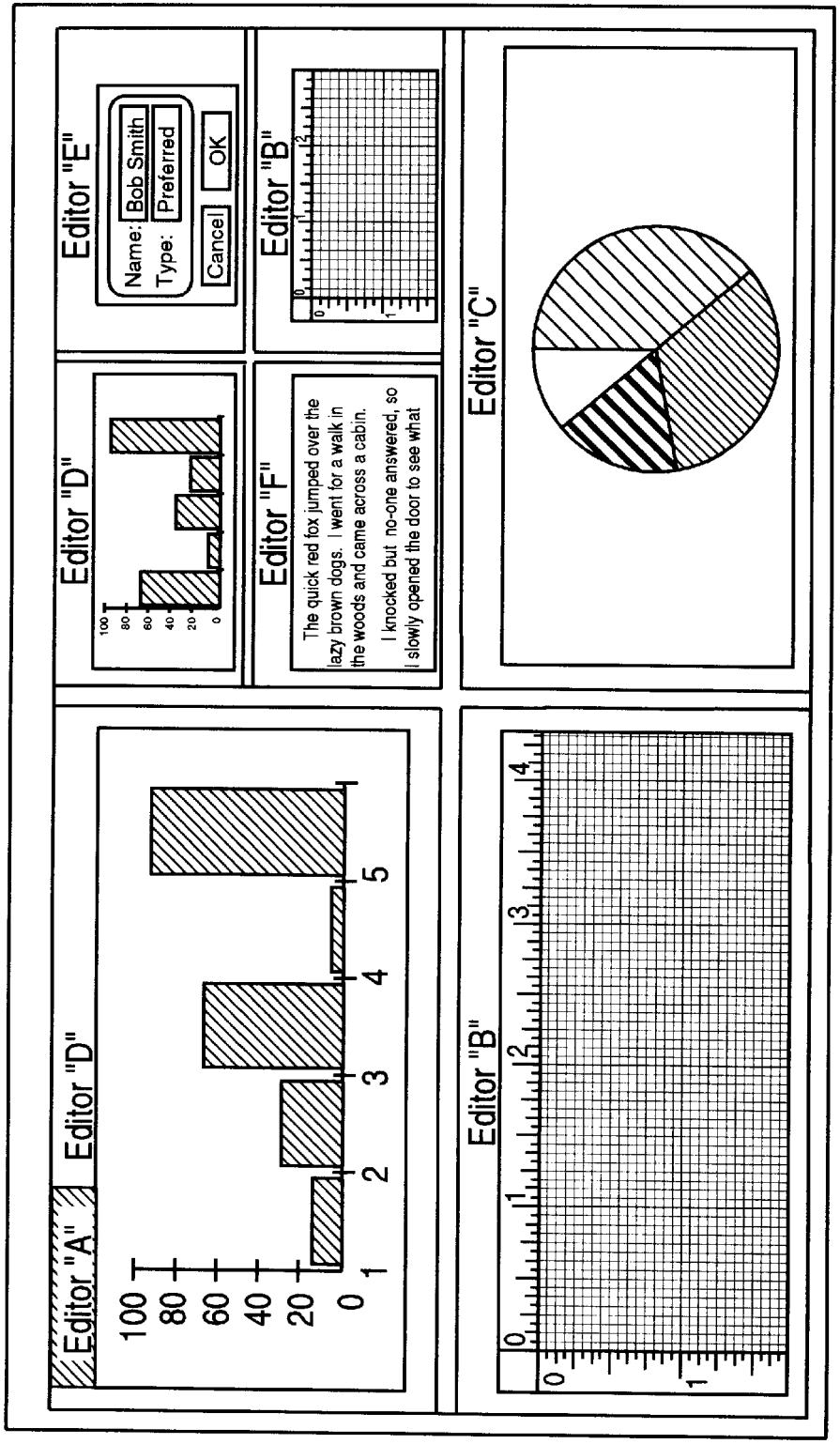
FIG. 9 illustrates docking two editor windows into a single editor window.

As discussed above, in addition to docking single panes and views, the advanced windows management system permits docking editor windows, which contain multiple views and panes, into another window. FIG. 9 illustrates docking the editor window 800 (FIG. 8) for the workspace "prototyping" into the upper right corner of the editor window 200 for "modeling." As shown in FIG. 9, all four views of the prototyping editor window are docked into the upper right hand corner of the modeling editor window to create a new editor window, labeled 900. Furthermore, a user may add and/or delete views from the newly created editor window 900 in accordance with the operations discussed above.

Figure 10A:
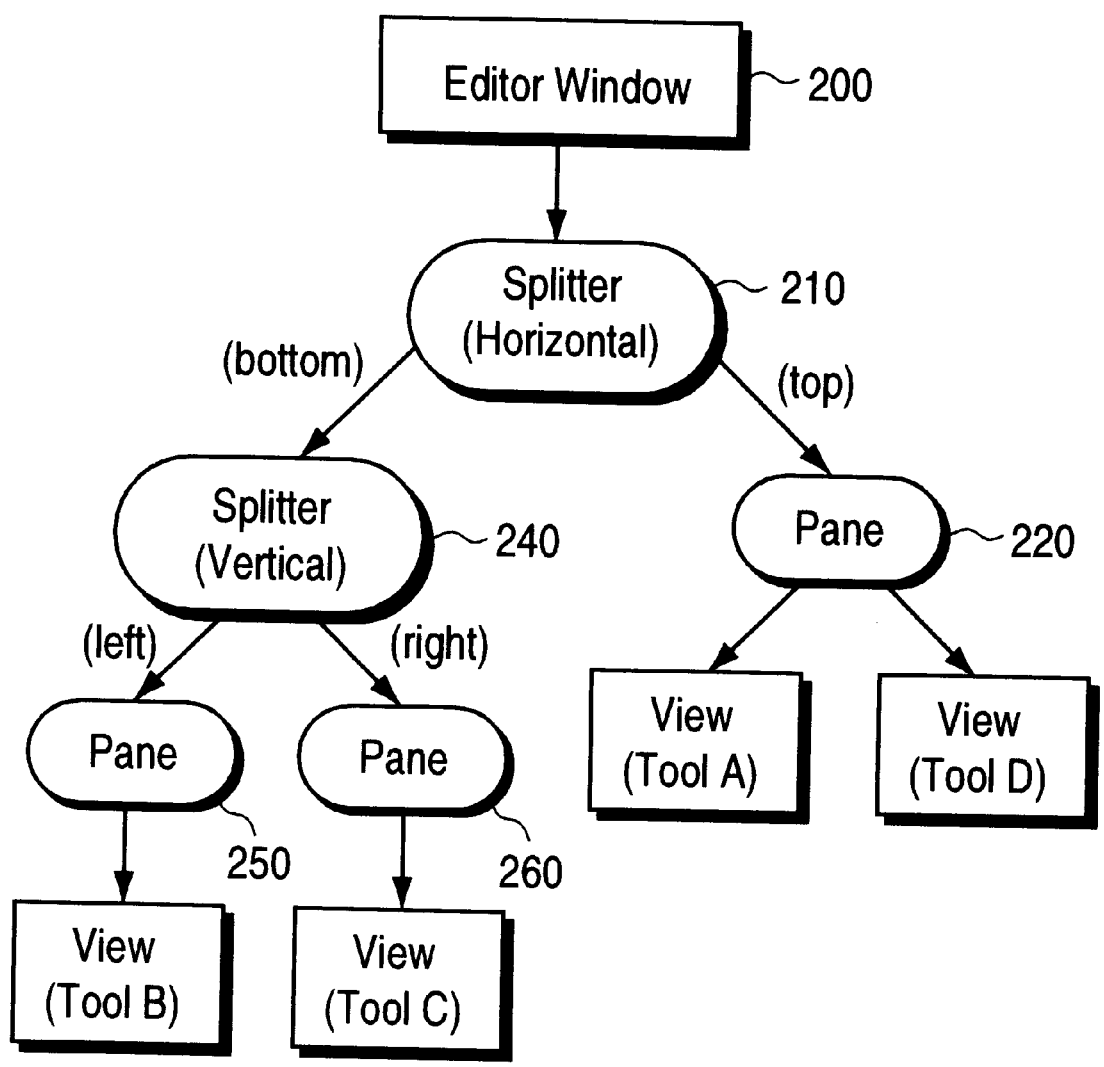
FIG. 10a illustrates a pane tree for the example editor window illustrated in FIG. 4b.

The advanced windows management system of the present invention may be implemented in any windows based operating system. For example, the advanced windows management system may be implemented in the Windows® operating system, or a UNIX based operating system, etc. In one embodiment for implementing the advanced windows management system, the advanced windows management system generates a pane tree. FIG. 10a illustrates an example pane tree used to implement the advanced windows management system of the present invention. In general, the pane tree contains splitters, panes, and views. The splitters correspond to the splitters displayed in the editor windows to delineate panes. Each pane contains one or more views.

The example pane tree illustrated in FIG. 10a maps the editor window 200 illustrated in FIG. 4b. The top of the pane tree contains a designation for the corresponding editor window. For the editor window 200, the splitter 210 is represented directly beneath the designation for the editor window 200. The splitter 210 indicates that the division of the editor window is horizontal, resulting in a top pane and a bottom pane. For the top portion of the editor window 200, a designation for pane 220 is shown in the pane tree directly beneath the splitter 210. As shown in the pane tree in FIG. 10a and as shown in the editor windows illustrated in FIGS. 4b and 4c, the pane 220 contains two views, one view for editor A and one view for editor D.

To represent the bottom portion of the editor window 200, the pane tree contains a designation for splitter 240 located beneath the splitter designation 210. The splitter 240 is a vertical splitter, and therefore a left and a right pane are generated. The left pane, identified as pane 250, contains the view for editor B. The lower right corner pane of the editor window 200, identified as pane 260, contains the view for editor C. As illustrated by the above example, the pane tree can easily represent even a very complex editor window that contains many panes and views.

Figure 10B:
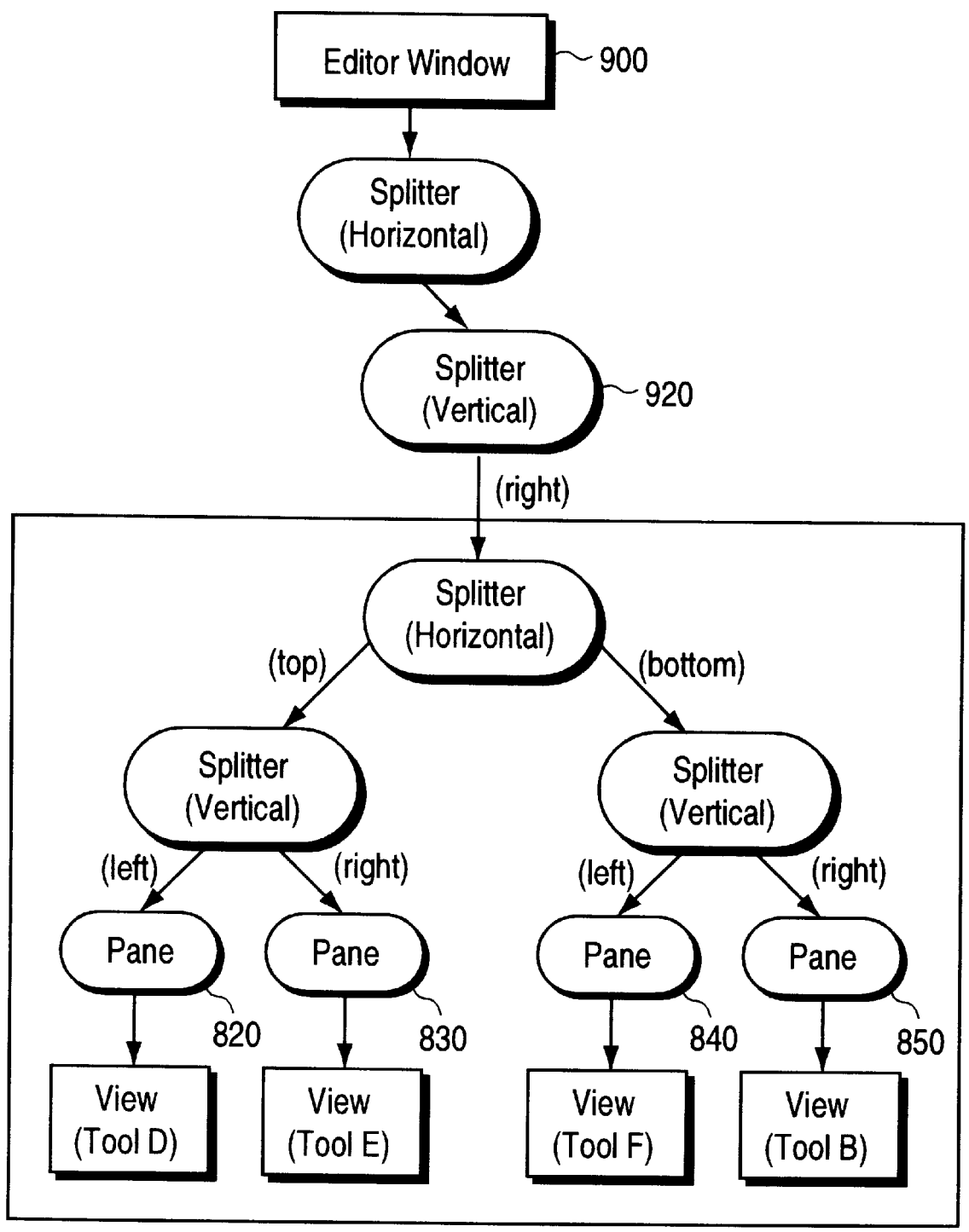
FIG. 10b illustrates a portion of a pane tree for an example editor window.

Through use of the pane tree implementation, the advanced windows management system is able to easily update the tree based on user edits to the corresponding editor window. For example, if a user drops the editor window 800 into the upper right side of editor window 200 to create the editor window 900, then the advanced windows management system updates the pane tree to define the new configuration. FIG. 10b illustrates a portion of a pane tree for the editor window 900. To update the pane tree for the new configuration, the advanced windows management system adds a vertical splitter 920. Directly beneath the splitter 920, the advanced windows management system inserts the pane tree that defined the editor window 800. Consequently, a complex editor window with many panes and views is manageable with the pane tree implementation.

Computer System:

FIG. 11 illustrates a high level block diagram of a general purpose computer system in which the advanced windows management system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the advanced windows management system of the present invention is wholly or partially implemented in software, then the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 11 as being connected via the bus 1025. However, the computer system 1025 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the advanced windows management system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the advanced windows management system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, the tools or editors may be input to the computer system 1000 via a portable storage medium or a network for processing by the advanced windows management system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The advanced windows management system may be implemented in either hardware or software. For the software implementation, the advanced windows management system is software that includes a plurality of computer executable instructions for implementation on a general purpose computer system. Prior to loading into a general purpose computer system, the advanced windows management system software may reside as encoded information on a computer readable medium, such as a magnetic floppy disk, magnetic tape, and compact disc read only memory (CD-ROM). In one hardware implementation, the advanced windows management system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A method for generating user customized windows in a computer system, said method comprising the steps of:

displaying a plurality of views, wherein a view comprises visual representations in a program window generated by an underlying program for which information is displayed to a user for use of the underlying program;

displaying a target window;

receiving user input, via a drag and drop operation, that specifies the selection of at least two views for placement of said views in locations, specified by said user input, within said target window to permit a user to drag said views and to drop said views into said target window;

displaying, in response to said user input, graphical feed back to indicate a potential location in said target window for placement of a view by said user in said target window;

docking, in response to said user input, said views for display within said target window; and displaying said views in said target window, such that a user is permitted to customize a target window with a plurality of views from different programs to permit grouping views from different programs in a single target window.

2. The method as set forth in claim 1, wherein said display information for a view comprises graphics, text and controls corresponding to a software development tool.

3. The method as set forth in claim 1, further comprising the step of displaying, in response to user input that specifies placement of a view on an existing view in said target window, more than one view in a single location in said target window such that said views are tabbed with a title of each view in a title bar.

4. The method as set forth in claim 1, wherein said views are associated with panes docked in a window.

5. The method as set forth in claim 1, wherein said views comprise a plurality of views situated in a window.

6. A method for generating customized workspace windows, said method comprising the steps of:

displaying a plurality of windows, wherein each window comprises at least one view for an editor program, said view comprises visual representations in a program window generated by an underlying editor program for which information is displayed to a user for use of the editor program;

displaying an editor window;

receiving user input, via a drag and drop operation, that specifies the selection of at least two views for placement of said views in a location of said editor window to permit a user to drag said views and to drop said views into said editor window;

displaying, in response to said user input, graphical feed back to indicate a potential location in said editor window for placement of a view by said user in said editor window;

docking, in response to said user input, said at least two views selected for inclusion in said editor window, and displaying said at least two views selected in said editor window, such that a user is permitted to customize said editor window with a plurality of views from different programs to permit grouping views from different programs in a single target window.

7. A computer readable medium comprising a set of instructions stored therein, which when executed by a computer, causes the computer to perform the steps of:

displaying a plurality of views, wherein a view comprises visual representations in a program window generated by an underlying program for which information is displayed to a user for use of the underlying program;

displaying a target window;

receiving user input, via drag and drop operation, that specifies the selection of at least two views for placement of said views in locations, specified by said user input, within said target window to permit a user to drag said views and to drop said views into said target window;

displaying, in response to said user input, graphical feedback to indicate a potential location in said target window for placement of a view by said user in said target window;

docking, in response to said user input, said views for display within said target window; and displaying said views in said target window, such that a user is permitted to customize a target window with a plurality of views from different programs to permit grouping views from different programs in a single target window.

8. The computer readable medium as set forth in claim 7, wherein the instructions for receiving user input to specify placement of said views within said target window comprise instructions for providing a drag and drop operation to permit a user to drag said views and to drop said views into said target window.

9. The computer readable medium as set forth in claim 8, further comprising instructions for displaying, in response to user input, graphical feed back to indicate a potential location in said target window for placement of a view by said user in said target window.

10. The computer readable medium as set forth in claim 7, wherein said display information for a view comprises graphics, text and controls corresponding to a software development tool.

11. The computer readable medium as set forth in claim 7, further comprising instructions for displaying, in response to user input that specifies placement of a view on an existing view in said target window, more than one view in a single location in said target window such that said views are tabbed with a title of each view in a title bar.

12. The computer readable medium as set forth in claim 7, wherein said views are associated with panes docked in a window.

13. The computer readable medium as set forth in claim 7, wherein said views comprise a plurality of views situated in a window.

14. A computer readable medium comprising a set of instructions stored therein, which when executed by a computer, causes the computer to perform the steps of:

displaying a plurality of windows, wherein each window comprises at least one view for an editor program, said view comprises visual representations in a program window generated by an underlying editor program for which information is displayed to a user for use of the editor program;

displaying an editor window;

receiving user input, via a drag and drop operation, that specifies the selection of at least two views for placement of said views in a location of said editor window to permit a user to drag said views and to drop said views into said editor window;

displaying, in response to said user input, graphical feed back to indicate a potential location in said editor window for placement of a view by said user in said editor window;

docking, in response to said user input, said at least two views selected for inclusion in said editor window, and displaying said at least two views selected in said editor window, such that a user is permitted to customize said editor window with a plurality of views from different programs to permit grouping views from different programs in a single target window.

15. A computer system comprising;

an input device for receiving user input;

an output display for displaying information;

processing unit for executing instructions for:

displaying a plurality of views, where a view comprises visual representations in a program window generated by an underlying program for which information is displayed to a user for use of the underlying program;

displaying a target window on said output display;

receiving user input from said input device for a drag and drop operation that specifies the selection of at least two views for placement of said views in locations, specified by said user input, within said target window to permit a user to drag said views and to drop said views into said target window;

displaying, in response to said user input, graphical feed back to indicate a potential location in said target window for placement of a view by said user in said target window;

docking, in response to said user input, said views for display within said target window; and displaying said views in said target window, such that a user is permitted to customize a target window with a plurality of views from different programs to permit grouping views from different programs in a single target window.

* * * * *